(12) United States Patent
Tong et al.

(10) Patent No.: US 7,421,163 B1
(45) Date of Patent: Sep. 2, 2008

(54) HIGH SPEED FREE SPACE OPTICAL DETECTION WITH GRATING ASSISTED WAVEGUIDE

(75) Inventors: Xiaolin Tong, Irvine, CA (US); Shing-Wu P. Tzeng, Fountain Valley, CA (US); Hua Zhang, Los Angeles, CA (US); Randall Blair, Oceanside, CA (US)

(73) Assignee: OWLink Technology, Inc., Irvine, CA (US)

( * ) Notice: Subject to any disclaimer, the term of this patent is extended or adjusted under 35 U.S.C. 154(b) by 0 days.

(21) Appl. No.: 11/142,882

(22) Filed: May 31, 2005

(51) Int. Cl.
G02B 6/34 (2006.01)
G02B 6/42 (2006.01)
H04B 10/13 (2006.01)

(52) U.S. Cl. ...................................... 385/37
(58) Field of Classification Search ............... 385/37, 385/43; 398/118
See application file for complete search history.

(56) References Cited

U.S. PATENT DOCUMENTS

| | | | |
|---|---|---|---|
| 5,621,715 A * | 4/1997 | Ohyama | 369/112.12 |
| 6,111,677 A * | 8/2000 | Shintani et al. | 398/126 |
| 6,748,144 B2 | 6/2004 | Lindsey | |
| 6,766,078 B1 * | 7/2004 | Canning | 385/37 |
| 6,915,080 B2 * | 7/2005 | Heminger et al. | 398/129 |
| 2002/0095618 A1 | 7/2002 | Orcutt et al. | |
| 2003/0043435 A1 * | 3/2003 | Oettinger et al. | 359/159 |
| 2004/0156590 A1 * | 8/2004 | Gunn et al. | 385/37 |
| 2004/0218870 A1 | 11/2004 | Blauvelt et al. | |
| 2005/0078913 A1 | 4/2005 | Blauvelt et al. | |
| 2005/0111309 A1 * | 5/2005 | Peng | 369/13.11 |

FOREIGN PATENT DOCUMENTS

| | | |
|---|---|---|
| GB | 2288907 A | 1/1995 |
| GB | 2288138 A | 8/1995 |

OTHER PUBLICATIONS

Microwave and Optical Waveguides, Nigel J Cronin, 1995. pp. 53 and 61-63.*
Bell, Ian; NEC Develops Wireless HDTV Tranceiver, Designtechnica News, Apr. 6, 2005, [online], [retrieved on Sep. 20, 2005]. Retrieved from the Internet <URL: http: http://news.designtechnica.com/article7034.html>, pp. 1-5.

(Continued)

*Primary Examiner*—Michelle R. Connelly-Cushwa
*Assistant Examiner*—Jerry T Rahll
(74) *Attorney, Agent, or Firm*—Fenwick & West LLP

(57) ABSTRACT

A grating assisted optical waveguide for use in free space optical detection is disclosed. High speed, high sensitivity, large field of view, and relaxed tolerance on alignment are enabled. The grating converts a free space incoming optical beam into guided mode. Converted optical signals propagate along the waveguide, and can be directed to an optical detector. As such, the optical intensity at the active area of the detector is increased significantly. A number of optical beam converter gratings for free space light collection can be used, including linear and ring structure gratings, chirped gratings, and multilayer gratings. Such a grating assisted optical waveguide can be used, for example, in a digital wireless multimedia system, where digital content is wirelessly transmitted from a source to a target destination, such as home-based video and audio entertainment systems.

25 Claims, 10 Drawing Sheets

OTHER PUBLICATIONS

Case, Loyd, ViXS Enables Wireless HDTV, 01-09-04, PCMagazine [online], [retrieved on Sep. 20, 2005]. Retrieved from the Internet <URL: http: http://www.pcmag.com/article2/0,4149,1429995,00.asp>, pp.1-7.

Chen, Ray, et al.; Fully Embedded Board-Level Guided-Wave Optoelectronic Interconnects, Proceedings of the IEEE, vol. 88, No. 6, Jun. 2000 [online], [retrieved on Sep. 20, 2005]. Retrieved from the Internet <URL: http://129.116.90.208/GroupPapers/2.pdf>, pp. 780-793.

Chen, Ray, et al.; Si CMOS process-compatible guided-wave optical interconnects; Proc. SPIE vol. 3632, Optoelectronic Interconnects VI, Julian P. Bristow; Suning Tang; Eds, Apr. 1999, pp. 22-27.

* cited by examiner

HIGH SPEED FREE SPACE OPTICAL DETECTION WITH GRATING ASSISTED WAVEGUIDE

RELATED APPLICATIONS

This application is related to U.S. application No. 10/411,559, filed Apr. 10, 2003, titled "MEMS Optical, Wireless Communication System," which claims the benefit of U.S. Provisional Application No. 60/372,046, filed Apr. 12, 2002. This application is also related to U.S. Application No. 11/059,013, filed Feb. 16, 2005, titled "MEMS Based Self-Aligning Video Data Transmission System," which claims the benefit of U.S. Provisional Application No. 60/544,901, filed Feb. 17, 2004. This application is also related to U.S. Application No. 10/854,558, filed May 27, 2004, titled "Wide-Angle Optical Detector." Each of these applications is herein incorporated in its entirety by reference.

FIELD OF THE INVENTION

The invention relates to free space optical communications, and more particularly, to free space optical detection with large field of view for use in optical communication systems and the like for applications requiring high sensitivity and high speed.

BACKGROUND OF THE INVENTION

In free space optical communication, an infrared light source transmits a collimated beam to an intended target (e.g., remote control for television and stereo applications). The size of the transmitted beam gets bigger as it propagates along the way. The optical power carried by the beam, however, generally attenuates to some extent, depending on the propagation distance. As a result, the optical intensity (which is the optical power per unit area of the transmitted beam) decreases as the propagation distance increases.

The receiving end of conventional free space optical communications typically requires a detector with a large active area, so as to capture as much of the transmitted beam as possible, thereby obtaining higher sensitivity. However, a large active area decreases the bandwidth of the detector. Moreover, there is added material and manufacturing cost associated with providing a large active area.

A single or group of lenses can be used to improve the sensitivity, by focusing the transmitted energy onto the active areas of the detector. However, the field of view of the detector is then limited by the extra optics. In addition, there are alignment issues associated with the use of lenses, particularly those systems involving multiple lens structures.

What is needed, therefore, are free space optical detection techniques that provide high speed, high sensitivity, large field of view, and relaxed tolerance on alignment.

SUMMARY OF THE INVENTION

One embodiment of the present invention provides a device for free space light collection for high sensitivity photon detection. The device includes a grating for converting free space optical signals into guided mode, and a multimode waveguide. The waveguide may include a tapered portion or a lens (or both) at one end for guiding converted optical signals to an active area of a detector. The waveguide may include a reflective coating (e.g., at an end opposite to the detector end) to redirect converted optical signals to the active area of the detector. The free space optical signals may include, for example, at least one of wireless video and audio content. In one such device, the grating for converting free space optical signals is configured with one of a linear or ring structure. The grating can have a dual layer structure with top and bottom layer gratings. In such a case, the top layer grating is for accepting a first range of incident angles (e.g., 18 to 45 degrees), and the bottom layer grating is for accepting a second range of incident angles (e.g., 0 to 20 degrees). The grating can be periodically chirped or linearly chirped, if so desired. The grating for converting free space optical signals may include a reflective coating to prevent loss of optical signals, thereby improving absorption.

Another embodiment of the present invention provides a device for free space light collection and detection. In this case, the device includes a photodetector having an active area for detecting optical signals collected from free space, a grating for converting free space optical signals into guided mode, and a multimode waveguide for guiding converted optical signals to the active area of the detector. In one such case, the photodetector has a field of view of ±45 degrees, with respect to normal incidence. The waveguide may include a tapered portion and/or lens for guiding the converted optical signals to the active area of the detector. A reflective coating can be used to redirect converted optical signals to the active area of the detector. The grating can have, for example, one of a linear or ring structure. The grating can have a dual layer structure with top and bottom layer gratings, where the top layer grating is for accepting a first range of incident angles, and the bottom layer grating is for accepting a second range of incident angles. The grating can be periodically chirped or linearly chirped. In one particular embodiment, the free space optical signals include video content, and the detector is adapted for operatively coupling with, or integrated into, a television for displaying the video content. In another particular embodiment, the free space optical signals include audio content, and the detector is operatively coupled with, or integrated into, a speaker for sounding the audio content.

Another embodiment of the present invention provides an optical communication system. The system includes an optical transmitter for transmitting optical signals into free space, a photodetector having an active area for detecting the optical signals transmitted into free space by the optical transmitter, and a multimode waveguide configured with a grating for converting free space optical signals transmitted by the optical transmitter into guided mode. The waveguide is for guiding converted optical signals to the active area of the detector. The optical transmitter transmits, for instance, infrared optical signals (e.g., in the 800 to 1600 nanometer range). In one configuration, the photodetector has a field of view of ±45 degrees, with respect to normal incidence. The waveguide may include a tapered portion or a lens (or both) for guiding the converted optical signals to the active area of the detector. A reflective coating can be used (e.g., on one or more sides of the waveguide) to redirect converted optical signals to the active area of the detector. The grating can have, for example, one of a linear or ring structure. The grating can have a dual layer structure with top and bottom layer gratings. In such a case, the top layer grating is for accepting a first range of incident angles, and the bottom layer grating is for accepting a second range of incident angles. The grating can be periodically chirped or linearly chirped. In one particular application, the system is a digital wireless multimedia system, including at least one of a home-based video and audio entertainment system. In one particular case, the transmitter is for wirelessly transmitting video content, and the detector is operatively coupled with, or integrated into, a television (e.g., HDTV enabled flat panel television) for displaying the video content. In another particular case, the transmitter is for wirelessly transmitting audio content, and the detector is operatively coupled with, or integrated into, a speaker for sounding the audio content.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1A:
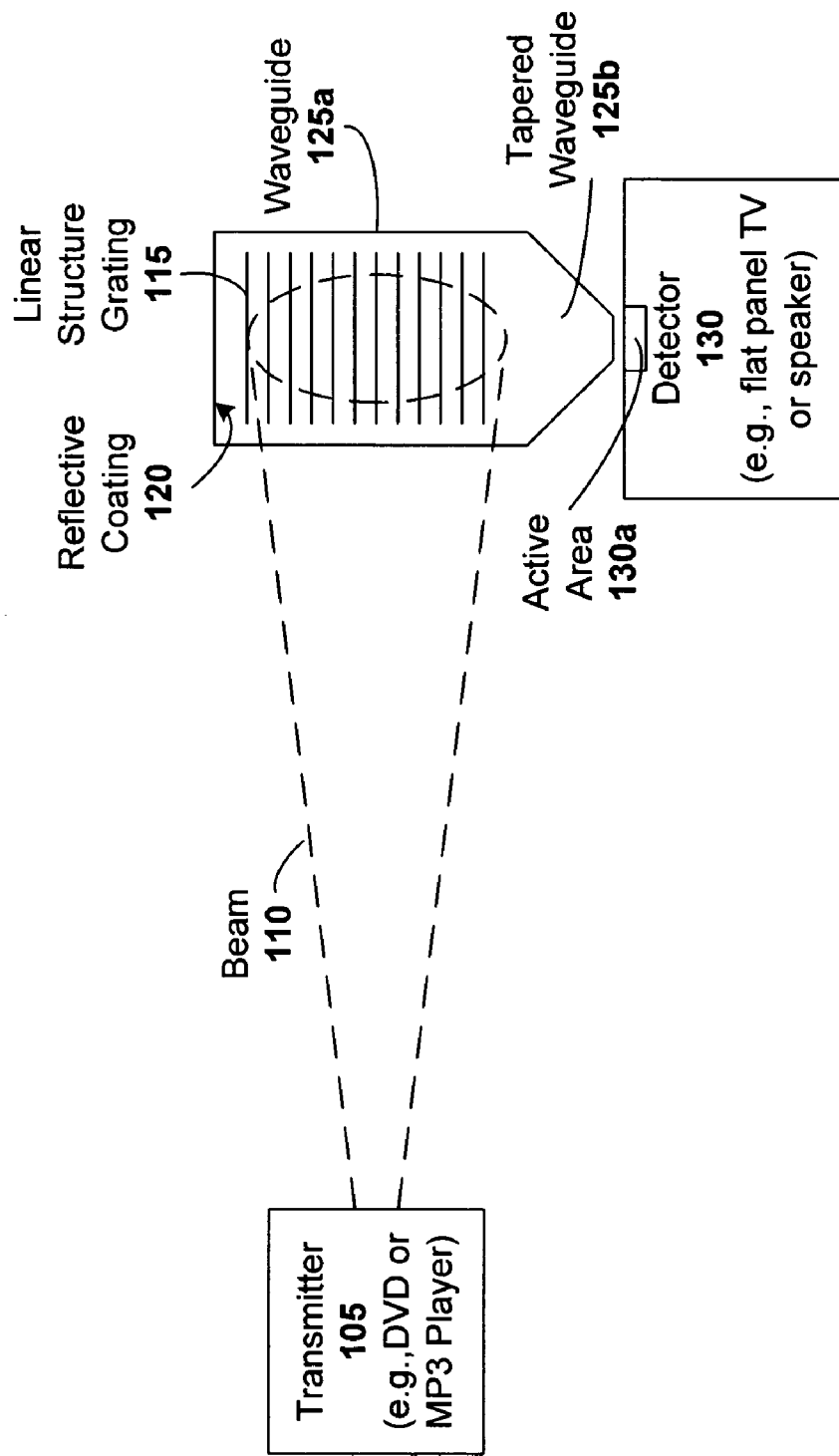
FIG. 1a is a block diagram of a free space optical communication system configured with a grating assisted waveguide in accordance with an embodiment of the present invention.

A grating assisted optical waveguide for use in free space optical detection is disclosed. High speed, high sensitivity, large field of view, and relaxed tolerance on alignment are enabled.

GENERAL OVERVIEW

One embodiment of the present invention includes a diffractive element, a waveguide (which can be tapered to further enhance detector sensitivity), and a high speed optical detector (e.g., 1 GHz to 10 GHz). The waveguide supports multimode propagation. The grating located within the waveguide converts free space incoming optical beam into guided mode. The converted optical signal therefore propagates along the multimode waveguide to the high speed optical detector. As such, the optical intensity at the active area of the detector is increased significantly. A large field of view can be achieved, for example, by chirping the grating or using multilayer uniform gratings.

Such a grating assisted optical waveguide can be used, for example, in a free space optical communication application requiring a detector capable of high speed and high sensitivity, in conjunction with a large field of view. Thus, numerous applications for wirelessly transmitting and receiving digital content can be realized. An example data rate 2.5 is Gbps (2500 Mbps) over a link distance of 15 meters (or more). Detection angles (field of view) are in the range of, for instance, ±45 degrees. One example such application is a digital wireless multimedia system, where digital content is wirelessly transmitted from a source to a target destination, such as home-based video and audio entertainment systems.

For instance, uncompressed HDTV video content can be wirelessly transmitted from a DVD player to an HDTV enabled flat panel television located elsewhere in the room. Here, the grating assisted optical waveguide can be located near or integrated into the housing of the HDTV enabled flat panel television. Similarly, MP3 audio content can be wirelessly transmitted from an MP3 player to a set of speakers located through-out the room. Here, a grating assisted optical waveguide can be located near or integrated into the housing of each of the speakers. Note that each speaker can also be configured to receive a certain channel of the transmission, so as to provide surround sound effect (e.g., two front speakers, two rear speakers, a center speaker, and a subwoofer). Such systems can be implemented without the hassle of messy cabling and the cumber of setting up a wired network-based system.

Another example application is a bidirectional digital wireless communication system, such as the system discussed in the previously incorporated U.S. Application No. 10/411, 559, titled "MEMS Optical, Wireless Communication System," which enables optical wireless communication between buildings and other locations. Numerous other unidirectional and bidirectional optical wireless communication systems will be apparent in light of this disclosure.

As previously explained, the size of a transmitted beam gets bigger as the beam propagates, thereby decreasing optical intensity at the receiving end. For instance, consider an optical detector that has an active area in the range of about f0.5 mm or smaller. In contrast, the illumination spot (at the detector area) from a remote transmitter is usually about (10 mm in size or larger, depending on the distance between the transmitter and detector. Thus, the majority of the transmitted optical power is lost. In one embodiment of the present invention, a grating assisted optical waveguide has a size of about 20×20 mm, thereby providing a significant increase in the optical power collection. Numerous configurations will be apparent in light of this disclosure, and the present invention is not intended to be limited to any one such embodiment.

Free Space Optical Communication System

FIG. 1a is a block diagram of a free space optical communication system configured with a grating assisted waveguide in accordance with an embodiment of the present invention. As can be seen, the system includes an optical transmitter 105, a multimode waveguide 125, and a photodetector 130. In this example application, the transmitter 105 is integrated or otherwise associated with a DVD player or an MP3 player, and the detector 130 is integrated or otherwise associated with a flat panel television or a speaker. The waveguide 125 includes two sections: waveguide 125a and tapered waveguide 125*b*. Note that waveguides 125*a* and 125*b* could be implemented as a single waveguide, or two separate waveguides coupled together. In this particular configuration, waveguide 125*a* includes a linear grating structure 115 and a reflective coating 120.

In operation, transmitter 105 wirelessly transmits optical beam 110 (e.g., 800 nanometer to 1500 nanometer infrared), which propagates through free space toward waveguide 125*a* at some distance away. Despite the collimated nature of the beam 110, it typically increases in size as it propagates. The beam 110 coming from free space has an incident angle in the range of 0 to 45 degrees with respect to the waveguide 125*a*. Thus, a wide field of view is provided. The grating 115 diffracts the incoming beam 110 from its original direction into a different direction. Therefore only a few angles are permitted to have diffracted light. Some of the diffracted light excites guided modes within the waveguide 125*a*, and propagates toward the detector 130. Light propagating in the waveguide 125 away from detector 130 is reflected back toward reflector by the reflective coating 120. The tapered down waveguide 125*b* delivers the guided light to the active area 130*a* of detector 130. In an alternative embodiment, the tapered waveguide 125*b* can be replaced with a waveguide lens configured to deliver the guided light to the active area 130*a* of detector 130. A combination of tapered waveguide and lens may also be used, if so desired. In any case, the optical intensity at the active area 130*a* of detector 130 is significantly increased. Typically, the active area 130*a* of the detector 130 is much smaller than the size of beam 110.

Details of the waveguide 125, reflective coating 120, and grating 115 will be discussed with references to FIGS. 2*a*-2*c* and 3*a*-3*d*. Both the optical transmitter 105 and the photodetector 130 can be implemented with conventional technology. In one particular embodiment, the transmitter 105 includes an 850 nanometer laser and a lens configured to collimate the optical beam 110 toward the grating 125*a*. Aiming controls may also be included in the system, where detection feedback is provided from the detector 130 to the transmitter 105. In such an embodiment, the feedback is used to adjust the lens of the transmitter so that more of the transmitted beam impinges on the grating 125*a*. For such aiming control configurations, note that a larger beam size allows the transmitter 105 quickly and fully illuminate or "capture" the optical detector. Example aiming controls with automatic beam alignment and tracking are discussed in the previously incorporated U.S. Application No. 11/059,013, filed Feb. 16, 2005, titled "MEMS Based Self-Aligning Video Data Transmission System." Detector 130 can be a high speed optical detector having an activation area of about +0.25 mm or smaller, although other detectors having larger activation areas (e.g., up to +0.5 mm, or greater) can also be used.

Note that an optical lens may also be used to collect the incoming beam to the photodetector 130 (instead of, or in addition to the grating 115 and waveguide 125). However, the lens may limit the detector's field of view, particularly if the grating assisted waveguide is not employed. In such a case, if incoming light has an incident angle outside of the field of view of active area 130*a* of detector 130, the collected optical power will likely be focused onto a non-detecting area.

Grating Assisted Waveguide

Figure 1B:
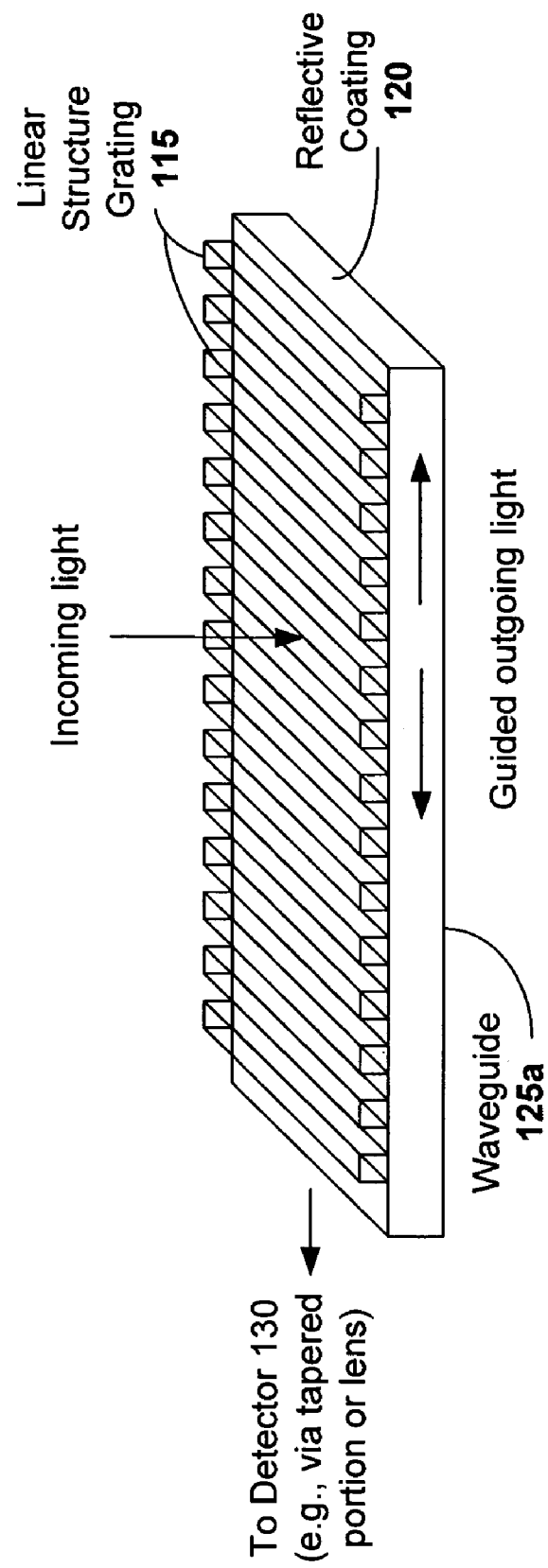
FIG. 1b is a schematic drawing of a grating assisted waveguide configured for use in the system of FIG. 1a, in accordance with an embodiment of the present invention.

FIG. 1*b* is a schematic drawing of a grating assisted waveguide configured for use in the system of FIG. 1*a*, in accordance with an embodiment of the present invention. For purposes of illustration, the top portion of the waveguide is not shown, so that the grating 115 can be viewed. As can be seen, the grating 115 in this example embodiment has a linear structure. Incoming light is converted into guided modes and propagates through the waveguide 125*a* along the directions perpendicular to the layout of linear grating 115 (as shown by arrows depicting outgoing light). One end of the waveguide 125*a* has a high reflector coating (e.g., gold, aluminum, nickel, or other reflective material) to reflect outgoing guided waves to the other direction, toward the photodetector 130. As previously discussed, waveguide 125*a* may include a tapered portion or a waveguide lens to further direct the guided light into the active area 130*a* of detector 130. Alternatively, no tapered portion or waveguide lens need be used, so long as enough light is guided into the active area 130*a* of detector 130 to realize the communication link.

Figure 1C:
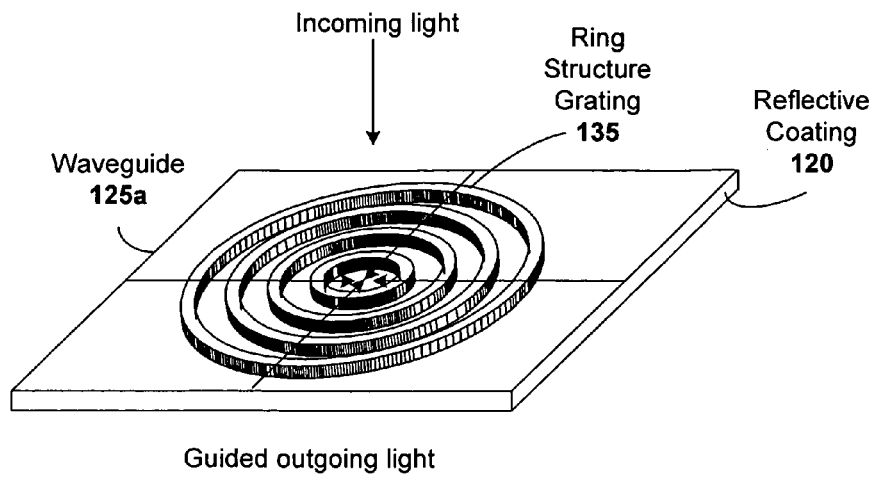
FIGS. 1c and 1d are schematic drawings of a grating assisted waveguide configured for use in the system of FIG. 1a, in accordance with another embodiment of the present invention.

FIG. 1*c* is a schematic drawing of a grating assisted waveguide configured for use in the system of FIG. 1*a*, in accordance with another embodiment of the present invention. For purposes of illustration, the top portion of the waveguide is not shown, so that the grating 135 can be viewed. In this case, a ring structure grating 135 is used. Just as with the linear structure 115 grating, the incoming free space optical light is converted into guided mode. With a ring grating configuration, part of the light propagates toward center of the grating 135, and the other part propagates away from the center of the grating 135. A centralized coupler is used to capture a large portion of the optical power, which is then delivered to the photodetector.

Figure 1D:
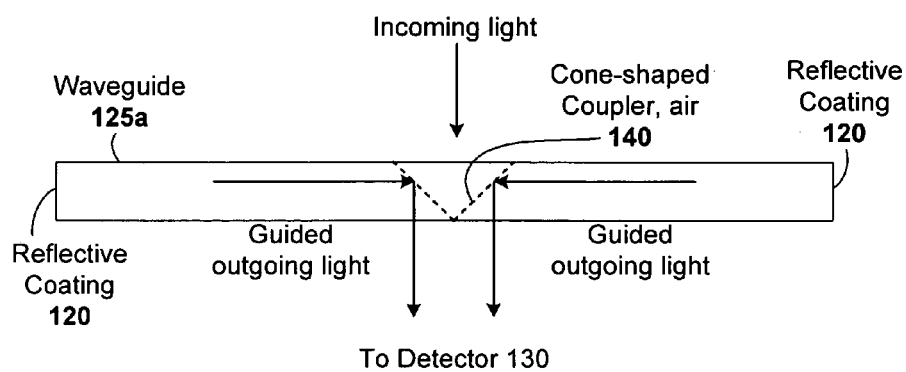

One method to couple the light out of the ring structure is to drill a small cone shaped hole in the center of the ring structure, as shown in side view in FIG. 1*d*. The guided outgoing light will be reflected out of the waveguide 125*a* once they reach the cone shape coupler or similar interface. Alternatively, a ball lens can be put in the center of the ring structure without drilling a hole. Here, the coupling mechanism (e.g., ball lens) should be in contact with the waveguide for better efficiency. The sides of the waveguide 125*a* can be coated with a high reflection or metal coating, so that the away portion of guided light will be reflected back to the center of the ring structure and collected.

As will be apparent in light of this disclosure, there are number of different embodiments that can be used to realize an effective communication link between transmitter 105 and detector 130. The grating assisted waveguide can be implemented, for example, as a thin multilayered plate configured with the grating therein so as to act as an optical beam converter and waveguide. The incoming optical beam from free space is converted at the properly designed grating into guided mode within the thin plate. The converted beam then propagates along the waveguide and is tapered down or otherwise provided to the active area 130*a* of high speed optical detector 130. The chromatic dispersion caused by the multipath in the waveguide can be minimized by balancing the optical power and path length.

The material forming the grating assisted waveguide should be transparent in the range of the wavelength of interest (e.g., 850 nanometer infrared). The material can be, for example, an infrared transparent plastic or polymer, such as polycarbonate, PMMA, SU-8, and/or PDMS. Other suitable materials can be used here as well, as will be apparent in light of this disclosure. The plate can be fabricated, for example, using conventional molding, cutting, and/or e-beam lithography techniques. In one embodiment, the grating assisted waveguide is a square thin plate with sides in the range of about 20 to 40 millimeters long and a thickness of about 1 to 5 millimeters. However, numerous shapes and dimensions can be implemented here, depending of the particular application.

Optical Beam Converter Gratings for Free Space Light Collection

Figure 2A:
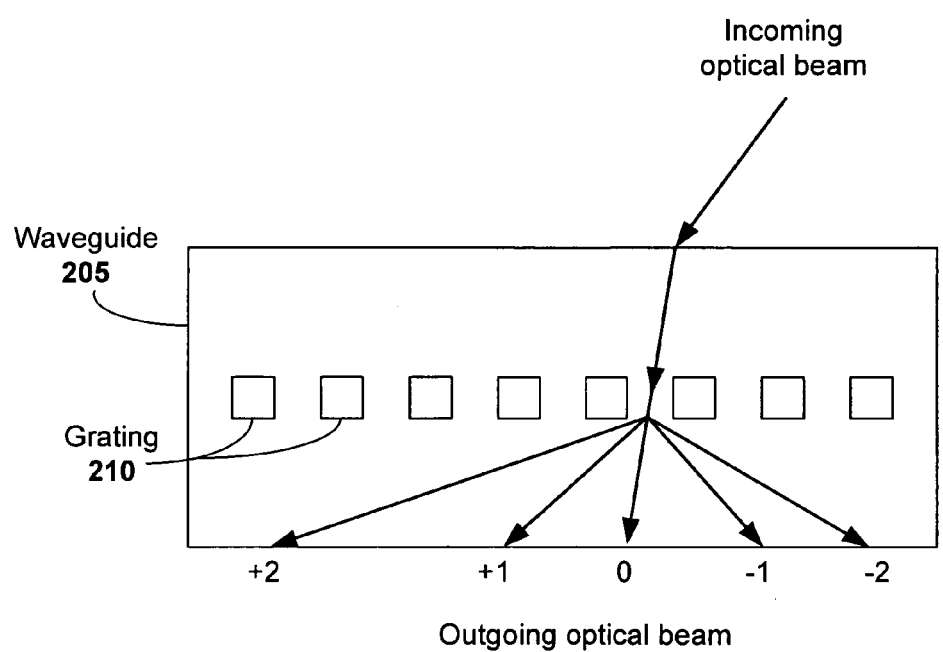
FIG. 2a is a cross-section view of a grating assisted waveguide operating as an optical beam converter, and configured in accordance with an embodiment of the present invention.

FIG. 2a is a cross-section view of a grating assisted waveguide operating as an optical beam converter, and configured in accordance with an embodiment of the present invention. An incoming optical light beam is shown scattering at the grating 210. The interference pattern has formed at the position of 0, +1, and ±2. The optical beam propagated along position 0 is propagated out of the waveguide 205. The scattering light at the positions of ±1 and ±2, however, is converted into guided mode and propagates through the waveguide 205 (toward the detector 130).

In more detail, the grating 210 divides an incident monochromatic beam into many outgoing beams. Based on the design of the grating 210, the majority of the optical power will lay in only a small number (e.g., 2 to 6) of outgoing beams. The period (or pitch) of the grating 210 ranges, for example, from a few hundred nanometers to about 2000 nanometers (2 microns). The grating areas come in a wide variety of dimensions, ranging from a few millimeters to 20 mm square or even larger, for instance. The grating profile is essentially binary (a rectangular wave) for the longer periods, and tends to be quasi-sinusoidal for shorter periods.

The grating 210 can be employed, for example, in one of two configurations: +1/−1 or 0/−1. In the +1/−1 configuration, the optical light is directed with normal incidence at the grating. In the 0/−1 configuration, the light is directed at the grating with an angle of incidence. In accordance with one embodiment of the present invention, the majority (e.g., 75% or more) of the refracted optical power in the +1/−1 configuration is divided evenly between the +1 and −1 positions. Likewise, in the 0/−1 configuration, the majority (e.g., 75% or more) of the refracted optical power is divided evenly between the 0 and −1 positions.

Figure 2B:
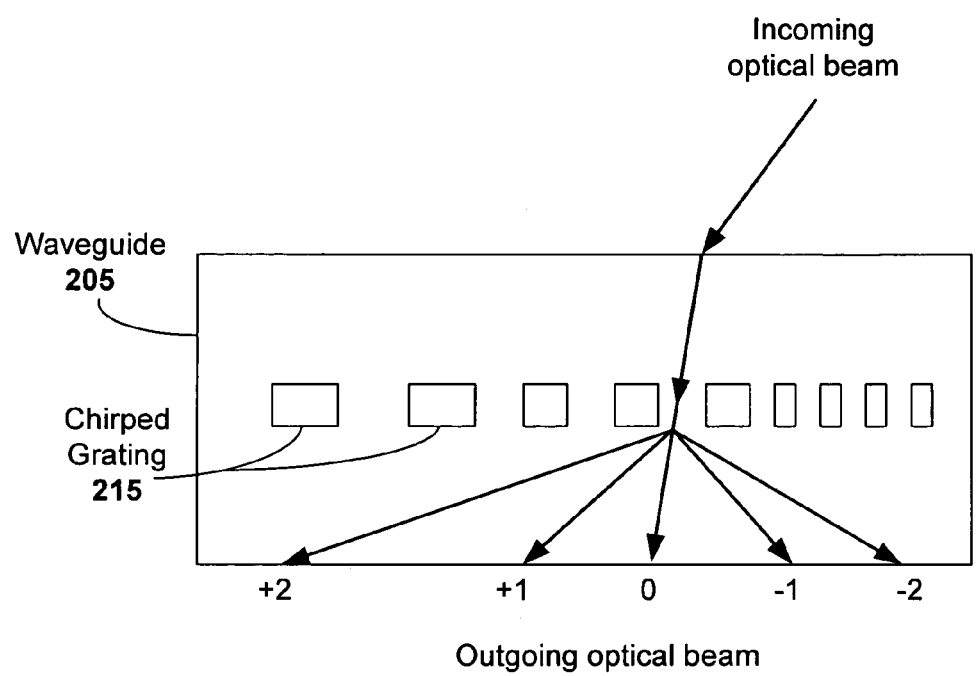
FIG. 2b is a cross-section view of a chirped grating assisted waveguide operating as an optical beam converter, and configured in accordance with another embodiment of the present invention.

FIG. 2b is a cross-section view of a chirped grating assisted waveguide operating as an optical beam converter, and configured in accordance with another embodiment of the present invention. This particular configuration helps to collect the optical light coming from different angles. At each particular angle, the overall efficiency will be reduced by certain amount. The chirped grating 215 also prevents the guided wave from scattering back to the free space.

To incorporate a chirped grating 215 within the waveguide 205, there will be a wide angle of acceptance for the incoming optical beam. At any particular angle, the overall efficiency will not be at the maximum possible value. Each angle range will be covered by certain area on the waveguide 205. The chirping layout could be linear through out. However, a configuration employing a periodically chirped pattern may provide better performance, as will be apparent in light of Equations 1, 2, and 3 described herein.

Figure 2C:
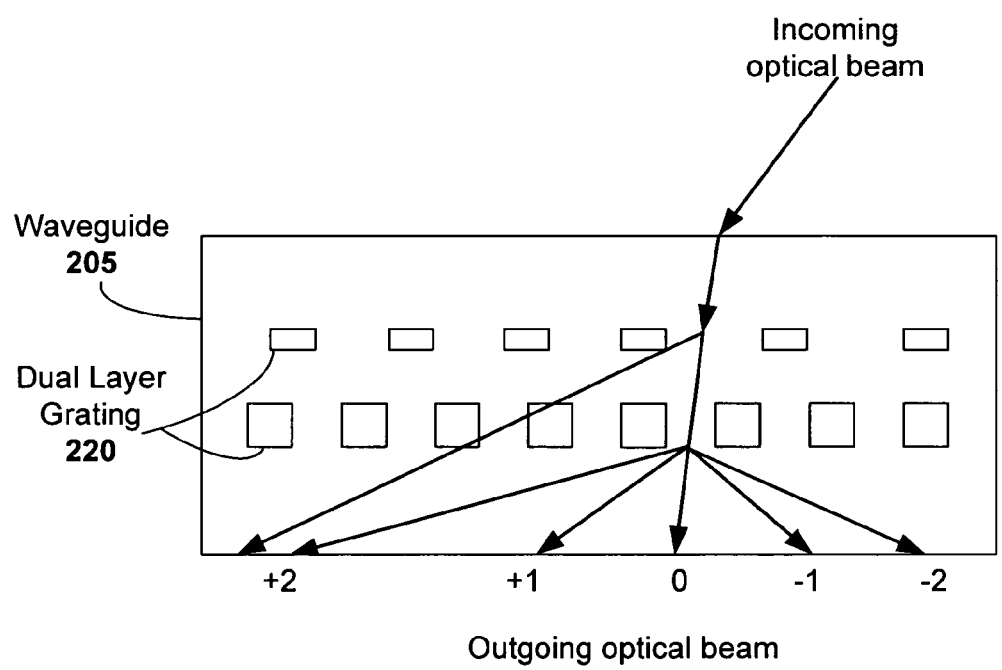
FIG. 2c is a cross-section view of a dual layer grating assisted waveguide operating as an optical beam converter, and configured in accordance with an embodiment of the present invention.

FIG. 2c is a cross-section view of a dual layer grating assisted waveguide operating as an optical beam converter, and configured in accordance with an embodiment of the present invention. In this particular configuration, two layers of uniform gratings are formed vertically within the waveguide 205. The top layer of grating 220 accepts large angle incoming optical beams (e.g., angle of incidence between 18 and 45 degrees). The bottom layer grating 220 accepts small and normal incident optical beams (e.g., angle of incidence between 0 and 20 degrees). The positive diffraction part (e.g., +1, +2, etc.) will be converted into guided mode directly. The negative diffraction part (e.g., −1, −2, etc.) goes to the bottom layer of grating 220 and is converted into guided mode afterwards. Such a dual layer grating embodiment may improve the overall collection efficiency of the system.

Note that each grating described here may also include a reflective coating. For example, a metal or other reflective coating can be layered on the surface of the grating. In such an embodiment, the incoming optical beam will pass through the uncoated (non-reflective) surface first, and then reach the grating. The light will then diffract as discussed herein. Although the majority of the light will diffract into the waveguide and propagate toward the detector, some of the light may be reflected back toward the grating. The metal coating on the grating will reflect this optical power back with the grating selected angle. Thus, absorption is increased.

Figure 3A:
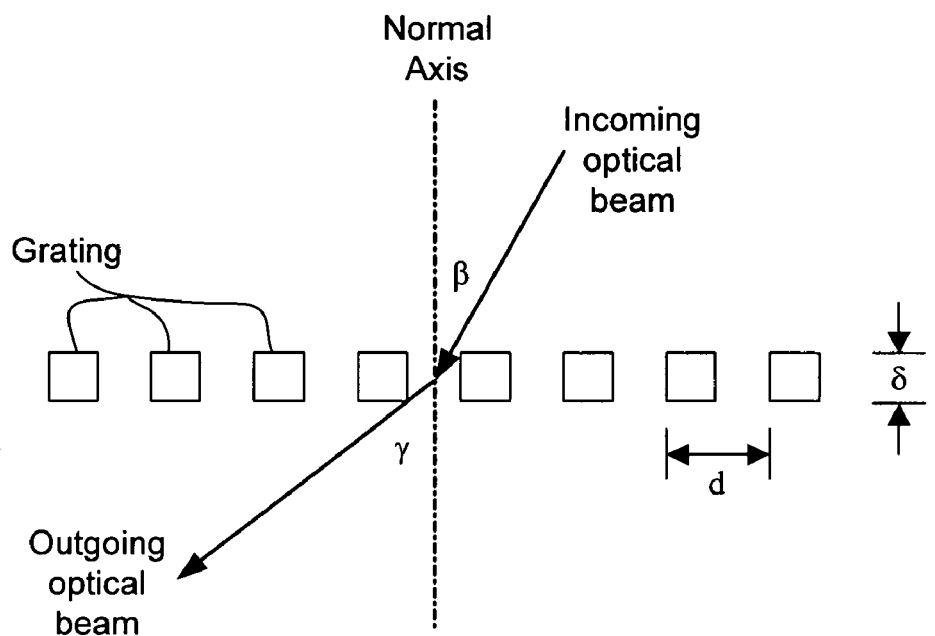
FIG. 3a is a schematic drawing showing diffraction of an optical beam at a grating configured in accordance with an embodiment of the present invention.

FIG. 3a is a schematic drawing showing diffraction of an optical beam at a grating configured in accordance with an embodiment of the present invention. The incident angle β is defined as the angle of incoming light with respect to the normal axis of the grating. The diffraction angle γ is defined as the angle of outgoing light with respect to the normal axis of the grating.

An optical beam converter grating for free space light collection configured in accordance with an embodiment of the present invention can be defined in terms of grating parameters, including the refractive index of n, for air, the refractive index of $n_2$ for the waveguide material, vacuum wavelength λ, incident angle β, outgoing angle γ, grating constant d, and phase shift amount δ.

To minimize the zero order outgoing power, the grating parameters obey Equation 1:

$$\delta = \lambda \cos \beta / (2n_2(n_2 - n_1))$$ (Equation 1)

The relations among positive diffraction, incident angle, and outgoing angle are as follows:

$$d = \lambda / n_2 / (\sin \gamma - \sin \beta)$$ (Equation 2)

The relations among negative diffraction, incident angle, and outgoing angle are as follows:

$$d = \lambda / n_2 / (\sin \gamma + \sin \beta)$$ (Equation 3)

Note that when positive diffraction is converted into a guided wave, the negative diffraction may only have a small outgoing angle.

Figure 3B:
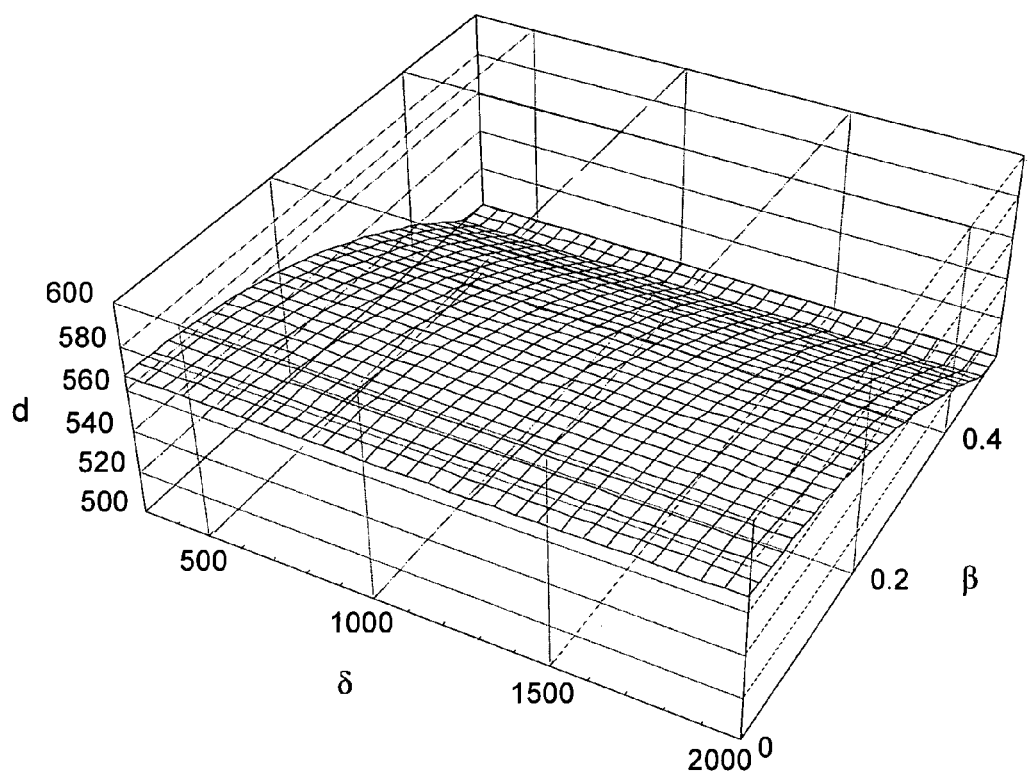
FIG. 3b illustrates a simulation plot showing grating parameters that minimize the zero order outgoing light, in accordance with an embodiment of the present invention.
Figure 3C:
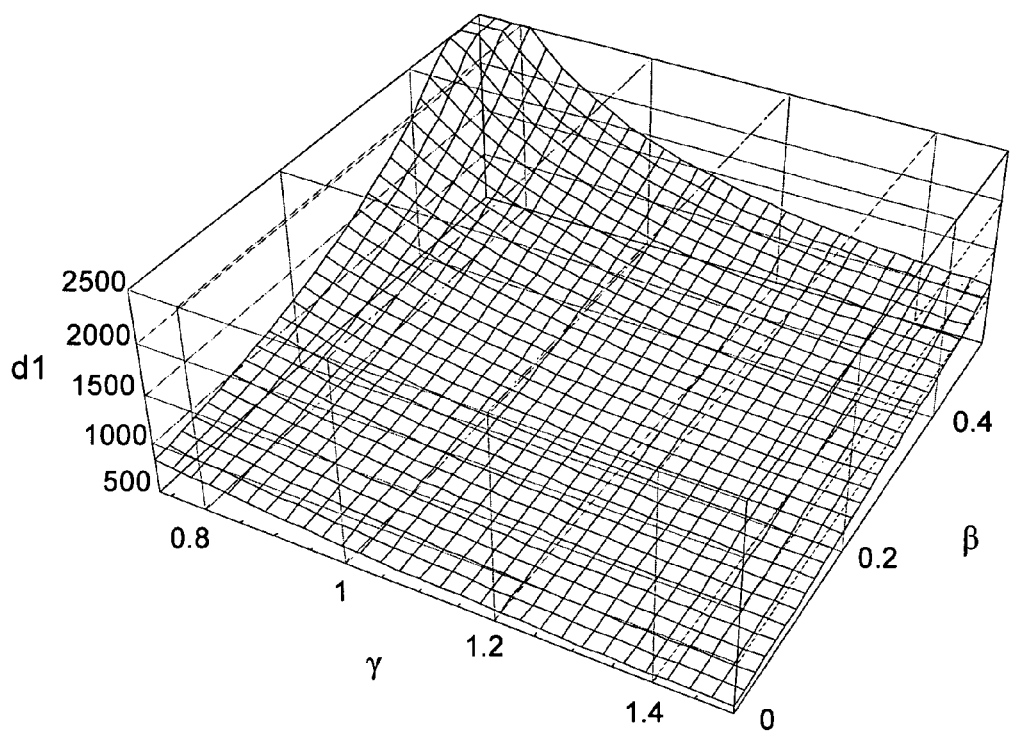
FIG. 3c illustrates a simulation plot of incident angle β, diffraction angle γ and grating constant d1 for gratings configured in accordance with an embodiment of the present invention. This plot is for the positive order of diffraction.
Figure 3D:
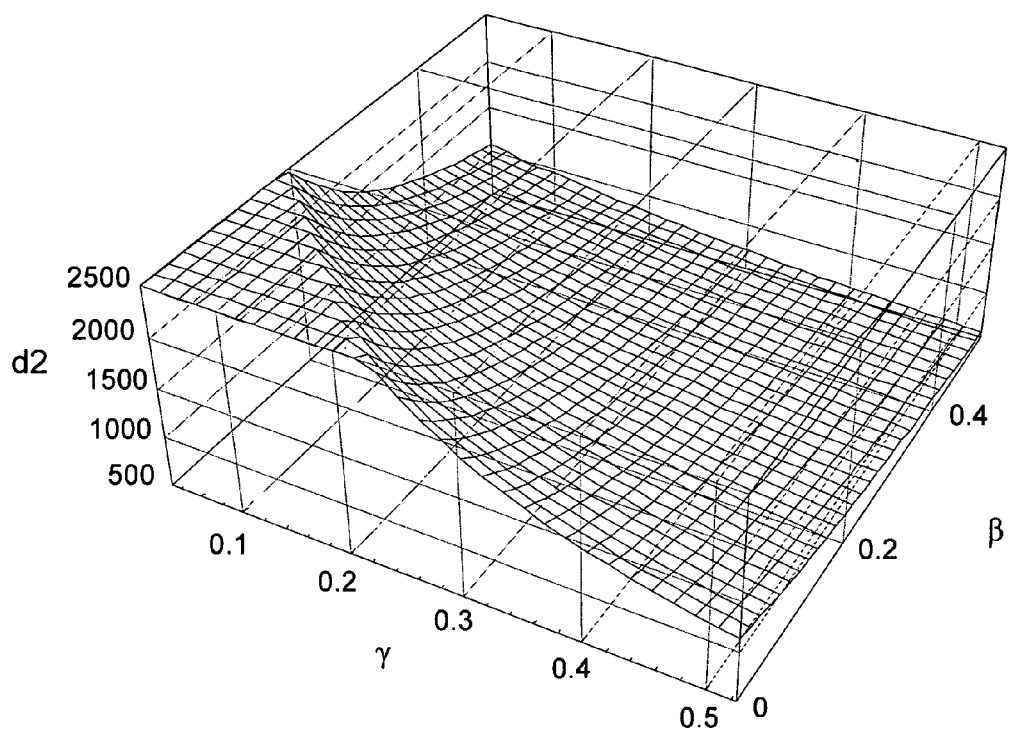
FIG. 3d illustrates a simulation plot of incident angle β, diffraction angle γ and grating constant d2 for gratings configured in accordance with an embodiment of the present invention. This plot is for the negative order of diffraction.

FIGS. 3b, 3c, and 3d are simulation plots based on Equations 1, 2, and 3, respectively.

In particular, FIG. 3b illustrates a simulation plot showing grating parameters that minimize the zero order outgoing light, in accordance with an embodiment of the present invention. Parameter δ is the phase shift amount of the grating in nanometers (nm). Parameter d is the constant of the grating in nm, and parameter β is the incident angle before the grating in radians. FIG. 3c illustrates a simulation plot of incident angle β, diffraction angle γ, and grating constant d1 for gratings configured in accordance with an embodiment of the present invention. This plot is for the positive order of diffraction. The incident angle β and diffraction angle γ are in radians, and the grating constant d1 is in nm. FIG. 3d illustrates a simulation plot of incident angle β, diffraction angle γ and grating constant d2 for gratings configured in accordance with an embodiment of the present invention. This plot is for the negative order of diffraction. The incident angle β and diffraction angle γ are in radians, and the grating constant d2 is in nm.

In one particular embodiment, to minimize the zero order outgoing beam, the phase shift δ of the grating should have a wavelength (e.g., 425 nm) that is approximately half the wavelength (e.g., 850 nm) of the optical path length difference. The phase shift δ value will vary depending on the incident angle. For dual layer gratings, the top layer grating can cover a first range of incident angles (e.g., 18 to 45 degrees), and bottom layer grating can cover a second range of incident angles (e.g., 0 to 20 degrees). Note that the first and second ranges can overlap, or they can be exclusive of one another, if so desired.

Manufacturing Process

As previously explained, a grating assisted waveguide configured for free space light collection and optical beam conversion can be fabricated, for example, using conventional molding, cutting, and/or e-beam lithography techniques. For instance, consider the case where an optical beam converter grating for free space light collection is made using conventional e-beam lithography (e.g., deposition, masking, and dry etching techniques). In one such embodiment, a grating mold is made using a blank substrate. The substrate material can be, for example, silicon (Si), quartz, or other such suitable substrate materials. The desired grating pattern (e.g., linear, chirped, or both) is formed on the surface of the substrate. This grating pattern can then be used as a master mold for use in mass production of grating assisted waveguides configured in accordance with an embodiment of the present invention.

In more detail, an optical beam converter grating can be made by coating a polymer on top of the master mold. The polymer material can be, for example, polycarbonate, PMMA, SU-8, PDMS, or the material from which compact discs are made. Then, after a thermal or ultraviolet (UV) curing process, the polymer layer can be separated from the mold, thereby producing a grating having the same pitch as the grating pattern of the maser mold. Note that the shape of the formed grating will be reversed from that of the master mold. However, with a 50% duty cycle, there is no difference in grating functionality. Note that if a duty cycle of other than 50% is desired, then the mold can be fabricated in the reverse of the desired grating pattern.

A top layer of polymer or glass can be used to cover the top surface of the formed grating to protect it from damage, and also to provide a layer of the waveguide. The other waveguide layers are already part of the grating (as a result from the molding process). The two layers can be coupled together using compression, or carefully placed epoxy (such that the epoxy will not affect light travel through the waveguide). The cross-section of the two stacked layers of thin polymer may resemble, for example, the cross-sections shown in FIGS. 2a (linear grating assisted waveguide) and 2b (chirped grating assisted waveguide). Note that the white (non-shaded) squares forming the grating within the center of the waveguide represent air in this embodiment, but could also be made from another material having the appropriate dimensions and refraction index.

For dual layer gratings, a different pitch master mold can be made (in similar fashion to the first master mold) to provide a second polymer grating. The first and second polymer gratings with different pitches can then be layered, one on top of the other. A third layer of polymer or glass can be used to cover the top surface grating to protect it from damage, and also to provide a layer of the waveguide. The other waveguide layers are already part of the grating (as a result from the molding process). The layers can be coupled, for example, using compression or carefully placed epoxy, as previously discussed. The cross-section of the three stacked layers of thin polymer may resemble, for example, the cross-section of the dual layer grating assisted waveguide shown in FIG. 2c.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optical communication system, comprising:
   an optical transmitter for transmitting uncompressed video content into free space of a room;
   a multimode waveguide having a chirped grating capable of simultaneously receiving the uncompressed video content at all angles up to 45 degrees with respect to normal incidence on the chirped grating for converting the transmitted uncompressed video content into guided mode optical signals; and
   a photodetector optically coupled with the multimode waveguide, the photodetector having an active area for detecting the guided mode optical signals so that the uncompressed video content can be provided to a display.

2. The system of claim 1 wherein the optical transmitter transmits infrared optical signals in between about 800 to 1600 nanometers.

3. The system of claim 1 wherein the transmitter is further configured for wirelessly transmitting audio content, the system further comprising:
   a second multimode waveguide having a second chirped grating that receives the uncompressed video content at any arbitrary angles up to 45 degrees with respect to normal incidence on the second chirped grating for converting the transmitted audio content into guided mode optical signals; and
   a second photodetector, optically coupled with the second multimode waveguide, the second photodetector having an active area for detecting the guided mode optical signals so that the audio content can be provided to a speaker for sounding.

4. The system of claim 1 wherein the waveguide includes at least one of a tapered portion and a lens for guiding the converted optical signals to the active area of the photodetector.

5. The system of claim 1 wherein the waveguide includes a reflective coating to redirect converted optical signals to the active area of the photodetector.

6. The system of claim 1 wherein the grating for converting the uncompressed video content into guided mode optical signals has one of a linear or ring structure.

7. The system of claim 1 wherein the grating for converting the uncompressed video content into guided mode optical signals is a dual layer grating having top and bottom layer gratings, the top layer grating for accepting a first range of incident angles, and the bottom layer grating for accepting a second range of incident angles.

8. The system of claim 1 wherein the grating for converting the uncompressed video content into guided mode optical signals is periodically chirped or linearly chirped.

9. The system of claim 1 wherein the system is a multimedia system configured for both video and audio entertainment systems.

10. The system of claim 1 wherein the transmitter is integrated into a source device, and the photodetector and the multimode waveguide are integrated into a television.

11. A device for free space light collection and detection, comprising:
   a chirped grating capable of simultaneously collecting optical signals including uncompressed video content transmitted through free space of a room from all angles up to 45 degrees with respect to normal incidence on the chirped grating for converting the collected optical signals into guided mode optical signals;

a multimode waveguide optically coupled to the chirped grating for guiding the guided mode optical signals; and a photodetector optically coupled with the multimode waveguide, the photodetector having an active area for detecting the guided mode optical signals.

12. The device of claim 11 wherein the photodetector and the multimode waveguide are integrated into a television.

13. The device of claim 11 wherein the device is also configured for coupling or integration with a speaker for sounding audio content optically transmitted in free space from an audio source.

14. The device of claim 11 wherein the waveguide includes a tapered portion for guiding the converted optical signals to the active area of the photodetector.

15. The device of claim 11 wherein the waveguide includes a lens for guiding the converted optical signals to the active area of the photodetector.

16. The device of claim 11 wherein the waveguide includes a reflective coating to redirect converted optical signals to the active area of the photodetector.

17. The device of claim 11 wherein the grating for converting the optical signals including uncompressed video content has one of a linear or ring structure.

18. The device of claim 11 wherein the grating for converting the optical signals including uncompressed video content has a dual layer structure with top and bottom layer gratings, the top layer grating for accepting a first range of incident angles, and the bottom layer grating for accepting a second range of incident angles.

19. The device of claim 11 wherein the grating for converting the optical signals including uncompressed video content is periodically chirped or linearly chirped.

20. A device for free space light collection for high sensitivity photon detection, comprising:

a chirped grating capable of simultaneously collecting uncompressed video content transmitted via free space optical signals through a room from all angles up to 45 degrees with respect to normal incidence on the chirped grating, the chirped grating for converting the free space optical signals into guided mode; and a multimode waveguide, optically coupled to the chirped grating, the waveguide including at least one of a tapered portion and a lens at one end for guiding the converted optical signals to an active area of a photodetector adapted for coupling or integration with the television, and a reflective coating at an opposite end to redirect converted optical signals to the active area of the photodetector.

21. The device of claim 20 wherein the device is also configured for coupling or integration with a speaker for sounding audio content optically transmitted in free space from an audio source.

22. The device of claim 20 wherein the grating for converting free space optical signals includes a reflective coating to prevent loss of optical signals.

23. The device of claim 20 wherein the grating for converting free space optical signals has one of a linear or ring structure.

24. The device of claim 20 wherein the grating for converting free space optical signals has a dual layer structure with top and bottom layer gratings, the top layer grating for accepting a first range of incident angles, and the bottom layer grating for accepting a second range of incident angles.

25. The device of claim 20 wherein the grating for converting free space optical signals is periodically chirped or linearly chirped.

* * * * *